United States Patent
Zhang et al.

(10) Patent No.: US 9,538,398 B2
(45) Date of Patent: Jan. 3, 2017

(54) METHOD, APPARATUS AND SYSTEM FOR ESTABLISHING NEIGHBOR RELATION

(71) Applicant: HUAWEI TECHNOLOGIES CO., LTD., Shenzhen (CN)

(72) Inventors: Kai Zhang, Shanghai (CN); Lan Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 14/164,841

(22) Filed: Jan. 27, 2014

(65) Prior Publication Data

US 2014/0141778 A1 May 22, 2014

Related U.S. Application Data

(63) Continuation of application No. PCT/CN2012/078787, filed on Jul. 18, 2012.

(30) Foreign Application Priority Data

Jul. 26, 2011 (CN) .......................... 2011 1 0210846

(51) Int. Cl.
*H04W 4/00* (2009.01)
*H04W 24/02* (2009.01)
(Continued)

(52) U.S. Cl.
CPC .............. *H04W 24/02* (2013.01); *H04W 36/00* (2013.01); *H04W 36/165* (2013.01); *H04W 48/18* (2013.01)

(58) Field of Classification Search
CPC ........ H04W 8/26; H04W 16/18; H04W 24/02; H04W 48/18; H04W 36/00; H04W 36/165
See application file for complete search history.

(56) References Cited

U.S. PATENT DOCUMENTS

2009/0129291 A1 5/2009 Gupta et al.
2010/0003980 A1* 1/2010 Rune et al. ................... 455/436
(Continued)

FOREIGN PATENT DOCUMENTS

CN 101605314 12/2009
CN 101651874 2/2010
(Continued)

OTHER PUBLICATIONS

Extended European Search Report issued on Jul. 7, 2014 in corresponding European Patent Application No. 12 81 6843.
(Continued)

*Primary Examiner* — Khalid Shaheed
(74) *Attorney, Agent, or Firm* — Staas & Halsey LLP

(57) ABSTRACT

The present invention is applicable to the field of communications, and provides a method, an apparatus and a system for establishing a neighbor relation. The method includes: receiving a discovery message sent by a long term evolution element management system LTE EMS for discovering an LTE to 3rd generation mobile communication 3G neighbor relation; obtaining, according to the discovery message, an LTE-3G neighbor relation policy corresponding to the LTE-to-3G neighbor relation among locally stored LTE-3G neighbor relation policies; and establishing a 3G-to-LTE neighbor relation if the policy allows a bidirectional neighbor relation. The technical solutions provided in the present invention have the advantage that a network terminal has few limitations.

12 Claims, 3 Drawing Sheets

(51) Int. Cl.
*H04W 48/18* (2009.01)
*H04W 36/00* (2009.01)
*H04W 36/16* (2009.01)

(56) References Cited

U.S. PATENT DOCUMENTS

| | | | |
|---|---|---|---|
| 2011/0053601 A1* | 3/2011 | Frederiksen et al. | 455/447 |
| 2012/0142337 A1* | 6/2012 | Wang | H04W 24/04 455/424 |
| 2012/0173875 A1* | 7/2012 | Mahidhara et al. | 713/168 |
| 2012/0202489 A1 | 8/2012 | Wang et al. | |

FOREIGN PATENT DOCUMENTS

| | | |
|---|---|---|
| CN | 101778369 | 7/2010 |
| EP | 2 141 951 | 1/2010 |
| EP | 2 627 120 | 8/2013 |
| WO | 2011/044849 | 4/2011 |

OTHER PUBLICATIONS

ZTE: "The way forward issues for UTRAN ANR R10 WI", 3GPP Draft; R3-103371, 3rd Generation Partnership Project (3GPP), Mobile Competence Centre; 650, Route Des Lucioles; F-06921 Sophia-Antipolis Cedex; France; vol. RAND WG3, no. Jacksonville, USA; Nov. 15, 2010, Nov. 9, 2010 (Nov. 9, 2010), XP050496705.

ZTE et al: "ANRF for UTRAN", 3GPP Draft; R3-102739, 3rd Generation Partnership Project (3GPP), Mobile Competence Centre; 650, Route Des Lucioles; F-06921 Sophia-Antipolis Cedex; France, vol. RAN WG3, no. Xi'an; Oct. 11, 2010, Oct. 11, 2010 (Oct. 11, 2010), XP050453470.

Email Discussion Rapporteur (Ericsson): "Report of email discussion [#7 Post-RAN3#70: 3G ANR Stage-2] on ANR open issues", 3GPP Draft; R3-110831, 3rd Generation Partnership Project (3GPP), Mobile Competence Centre; 650, Route Des Lucioles; F-06921 F-06921 Sophia-Antipolic Cedex; France; vol. RAN WG3, no. Taipei, Taiwan; Feb. 21, 2011, Feb. 14, 2011 (Feb. 15, 2011), XP050497719.

PCT International Search Report and Written Opinion of the International Searching Authority dated Nov. 1, 2012 in corresponding International Patent Application No. PCT/CN2012/078787.

International Search Report mailed Nov. 1, 2012 in corresponding International Patent Application No. PCT/CN2012/078787.

* cited by examiner

METHOD, APPARATUS AND SYSTEM FOR ESTABLISHING NEIGHBOR RELATION

CROSS-REFERENCE TO RELATED APPLICATIONS

This application is a continuation of International Application No. PCT/CN2012/078787, filed on Jul. 18, 2012, which claims priority to Chinese Patent Application No. 201110210846.4, filed on Jul. 26, 2011, both of which are hereby incorporated by reference in their entireties.

TECHNICAL FIELD

The present invention relates to the field of communications, and in particular, to a technology of establishing a neighbor relation.

BACKGROUND

With the development of technologies, long term evolution (Long Term Evolution, LTE) and 3rd generation mobile communication (3rd Generation, 3G) technologies have been developed considerably. Currently, both the LTE system and the 3G system have implemented an automatic neighbor relation (Automatic Neighbor Relation, ANR) feature. For a neighbor relation between systems (between LTE and 3G), the ANR function of an LTE user equipment supports the discovery of an "LTE-to-3G" neighbor relation, and the ANR function of a 3G user equipment supports the discovery of a "3G-to-LTE" neighbor relation. For both the discovery of the LTE-to-3G neighbor relation and the discovery of the 3G-to-LTE neighbor relation, the LTE or 3G user equipment (User Equipment, UE) needs to support the ANR function. Taking a direction from the 3G system to the LTE system as an example, to establish a 3G-to-LTE neighbor relation, the 3G UE needs to support capabilities such as ANR measurement and log (Log).

However, in the prior art, plenty of 3G UEs do not support ANR measurement or log, which restricts the establishment of a 3G-to-LTE neighbor relation. When a 3G UE does not support the ANR function, a 3G-to-LTE neighbor relation cannot be established, so a network terminal has great limitations.

SUMMARY

Embodiments of the present invention aim to provide a method for establishing a neighbor relation to solve a problem in the prior art that when a 3G UE does not support an ANR function, a 3G-to-LTE neighbor relation cannot be established.

In one aspect, the present invention provides a method for establishing a neighbor relation, including: receiving a discovery message sent by a long term evolution element management system LTE EMS for discovering an LTE to 3rd generation mobile communication 3G neighbor relation; obtaining, according to the discovery message, an LTE-3G neighbor relation policy corresponding to the LTE-to-3G neighbor relation among locally stored LTE-3G neighbor relation policies; and establishing a 3G-to-LTE neighbor relation if the policy allows a bidirectional neighbor relation.

In another aspect, the present invention provides a method for establishing a neighbor relation, including: obtaining, according to a received LTE to 3rd generation mobile communication 3G neighbor relation, an LTE-3G neighbor relation policy corresponding to the LTE-to-3G neighbor relation among locally stored LTE-3G neighbor relation policies; and if the policy allows a bidirectional neighbor relation, sending a message for establishing a 3G-to-LTE neighbor relation to a 3G EMS to enable the 3G EMS to establish a 3G-to-LTE neighbor relation.

In another aspect, the present invention further provides an apparatus for establishing a neighbor relation, including: a receiving unit, configured to receive a discovery message sent by a long term evolution element management system LTE EMS for discovering an LTE to 3rd generation mobile communication 3G neighbor relation; an obtaining unit, configured to obtain, according to the discovery message, an LTE-3G neighbor relation policy corresponding to the LTE-to-3G neighbor relation among locally stored LTE-3G neighbor relation policies; and an establishing unit, configured to establish a 3G-to-LTE neighbor relation if the policy allows a bidirectional neighbor relation.

In another aspect, the present invention further provides an apparatus for establishing a neighbor relation, including: a policy obtaining unit, configured to obtain, according to a received LTE to 3rd generation mobile communication 3G neighbor relation, an LTE-3G neighbor relation policy corresponding to the LTE-to-3G neighbor relation among locally stored LTE-3G neighbor relation policies; and a sending unit, configured to send, if the policy allows a bidirectional neighbor relation, a message for establishing a 3G-to-LTE neighbor relation to a 3G EMS to enable the 3G EMS to establish a 3G-to-LTE neighbor relation.

In another aspect, the present invention provides a system for establishing a neighbor relation, including a long term evolution element management system LTE EMS, a 3rd generation mobile communication element management system 3G EMS, and a network management system NMS. The LTE EMS is configured to send a discovery message for discovering an LTE-to-3G neighbor relation; and, the NMS is configured to obtain, according to the received discovery message, an LTE-3G neighbor relation policy corresponding to the LTE-to-3G neighbor relation among locally stored LTE-3G neighbor relation policies; and establish a 3G-to-LTE neighbor relation if the policy allows a bidirectional neighbor relation.

In another aspect, the present invention provides a system for establishing a neighbor relation, including a long term evolution element management system LTE EMS, a 3rd generation mobile communication element management system 3G EMS, and a network management system NMS. The LTE EMS is configured to obtain, according to a received LTE-to-3G neighbor relation, an LTE-3G neighbor relation policy corresponding to the LTE-to-3G neighbor relation among locally stored LTE-3G neighbor relation policies; and send an establishment message for establishing a 3G-to-LTE neighbor relation to the 3G EMS if the policy allows a bidirectional neighbor relation. The 3G EMS is configured to establish a 3G-to-LTE neighbor relation according to the establishment message.

In the above technical solutions, a network management system NMS receives a discovery message sent by an LTE EMS for discovering an LTE-to-3G neighbor relation, obtains a policy corresponding to the neighbor relation among locally stored policies, and establishes a 3G-to-LTE neighbor relation if the policy allows a bidirectional neighbor relation. In the method provided in the present invention, a 3G UE does not need to additionally support an ANR function in establishing a 3G-to-LTE neighbor relation. Therefore, the functions of the 3G UE impose no limitation on the establishment of the 3G-to-LTE neighbor relation, the 3G UE in the method imposes few limitations on the establishment of the neighbor relation, so a network terminal has few limitations.

DESCRIPTION OF EMBODIMENTS

To make the objectives, technical solutions, and advantages of the present invention more comprehensible, the following further describes the present invention in detail with reference to the accompanying drawings and embodiments. It is understandable that the specific embodiment is only used to explain the present invention and is not intended to limit the present invention.

Figure 1:
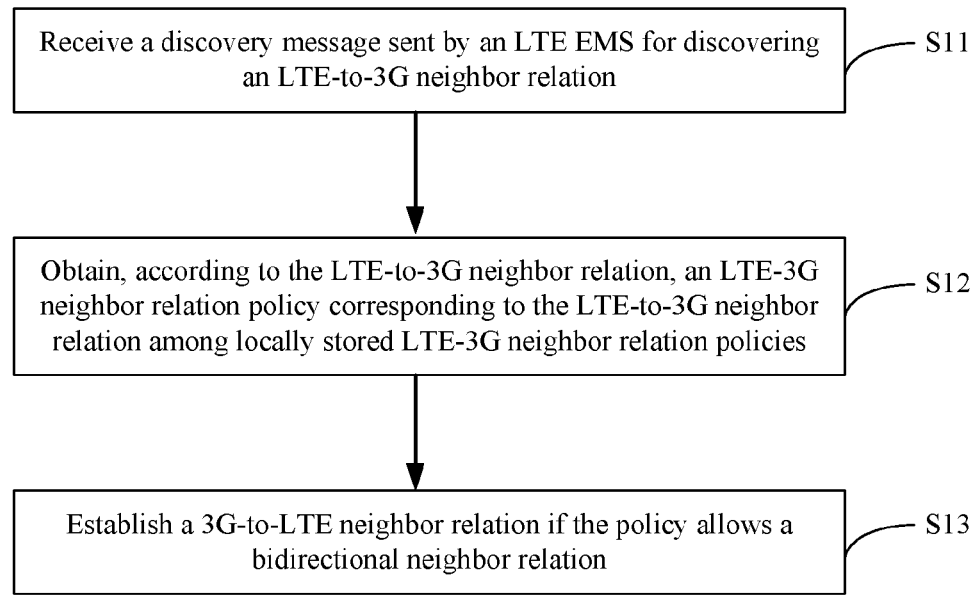
FIG. 1 is a flowchart of a method for establishing a neighbor relation according to an embodiment of the present invention.
Figure 2:
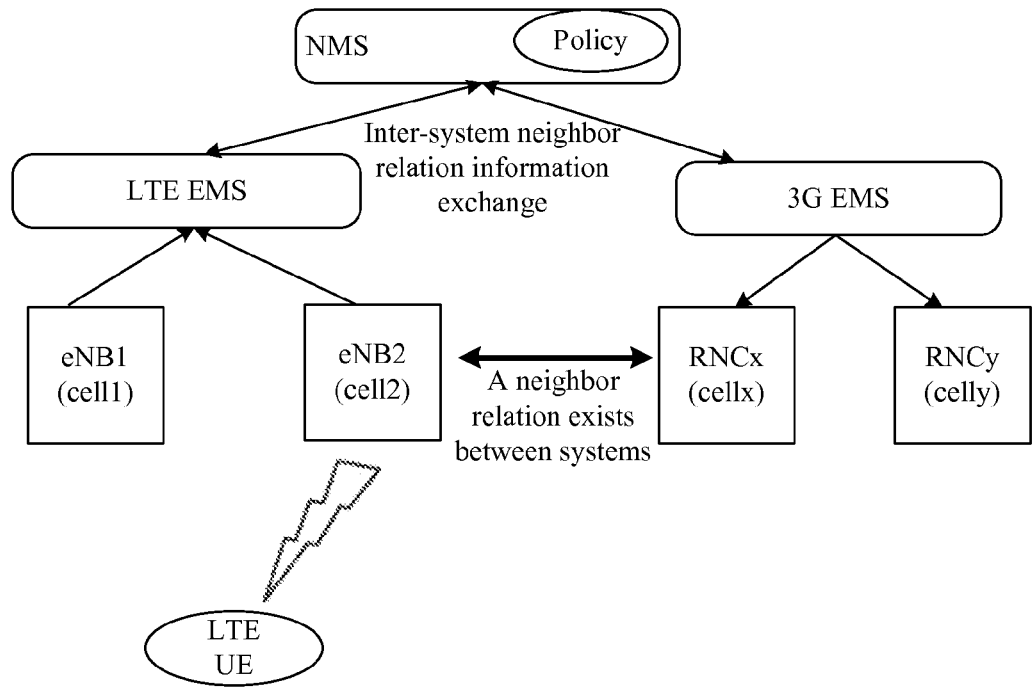
FIG. 2 is a scenario of implementing a method for establishing a neighbor relation according to an embodiment of the present invention.

The present invention provides a method for establishing a neighbor relation. The method is implemented by a network management system (Network Management System, NMS). The method is shown in FIG. 1, and a scenario of implementing the method is shown in FIG. 2. An interface between an EMS (including LTE EMS and 3G EMS) and an NMS may be a northbound interface (Interface-N, itf-N for short). The method includes the following:

S11. Receive a discovery message sent by an LTE EMS for discovering an LTE-to-3G neighbor relation.

S12. Obtain, according to the LTE-to-3G neighbor relation, an LTE-3G neighbor relation policy corresponding to the LTE-to-3G neighbor relation among locally stored LTE-3G neighbor relation policies.

S13. Establish a 3G-to-LTE neighbor relation if the policy allows a bidirectional neighbor relation.

Optionally, after S13, the method may further include: if the policy does not allow a bidirectional neighbor relation, determining whether a 3G-to-LTE neighbor relation corresponding to the LTE-to-3G neighbor relation exists in the 3G system; and, if the 3G-to-LTE neighbor relation corresponding to the LTE-to-3G neighbor relation exists, deleting the 3G-to-LTE neighbor relation from the 3G system.

In the method provided in the present invention, an NMS receives a discovery message sent by an LTE EMS for discovering an LTE-to-3G neighbor relation, obtains a policy corresponding to the neighbor relation among locally stored policies, and establishes a 3G-to-LTE neighbor relation if the policy allows a bidirectional neighbor relation. In the method provided in the present invention, a 3G UE does not need to additionally support an ANR function in establishing a 3G-to-LTE neighbor relation. Therefore, the functions of the 3G UE impose no limitation on the establishment of the 3G-to-LTE neighbor relation, and the 3G UE in the method imposes few limitations on the establishment of the neighbor relation, so a network terminal has few limitations.

Optionally, the method may further include: when an LTE-3G neighbor relation policy stored locally on the NMS changes, updating a neighbor relation between the LTE system and the 3G system according to the changed policy.

The specific implementation manner may be: taking the foregoing step as an example, if the original policy supports a bidirectional neighbor relation but the changed policy does not support the bidirectional neighbor relation, deleting the 3G-to-LTE neighbor relation; if the original policy does not support a bidirectional neighbor relation but the changed policy supports the bidirectional neighbor relation, establishing a 3G-to-LTE neighbor relation.

Optionally, according to networking requirements, a user (such as an operator) may flexibly configure the LTE-3G neighbor relation policy stored locally on the NMS. For example, when the coverage of an LTE system horizontally overlaps the coverage of a 3G system in certain regions or the coverage of an LTE system is adjacent to the coverage of a 3G system in certain regions, a bidirectional neighbor relation or a unidirectional neighbor relation may be set.

Figure 3:
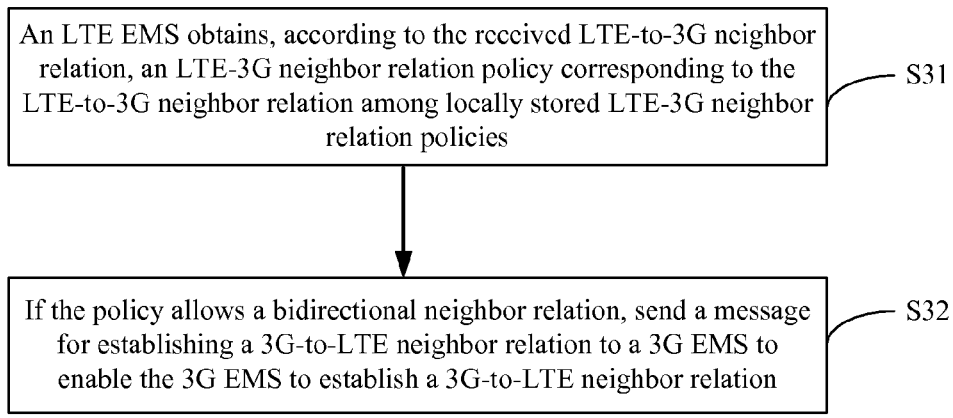
FIG. 3 is a flowchart of a method for establishing a neighbor relation according to an embodiment of the present invention.
Figure 4:
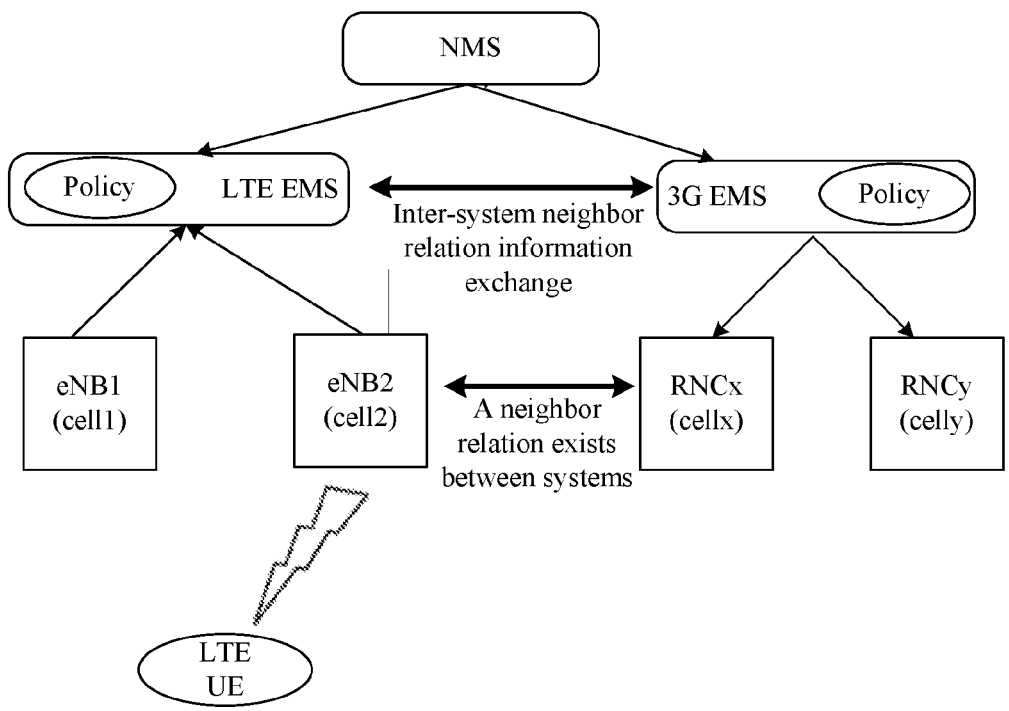
FIG. 4 is a scenario of implementing a method for establishing a neighbor relation according to an embodiment of the present invention.

The present invention provides a method for establishing a neighbor relation. The method is implemented by an LTE element management system (Element Management System, EMS). The specific flowchart of the method is shown in FIG. 3, and a scenario of implementing the method is shown in FIG. 4. As shown in FIG. 4, an interface between an LTE EMS and a 3G EMS may be a horizontal P2P interface (Interface-P2P). The method includes the following:

S31. The LTE EMS obtains, according to a received LTE-to-3G neighbor relation, an LTE-3G neighbor relation policy corresponding to the LTE-to-3G neighbor relation among locally stored LTE-3G neighbor relation policies.

S32. If the policy allows a bidirectional neighbor relation, send a message for establishing a 3G-to-LTE neighbor relation to a 3G EMS to enable the 3G EMS to establish a 3G-to-LTE neighbor relation.

Optionally, if the policy does not allow the bidirectional neighbor relation, send a message for deleting a 3G-to-LTE neighbor relation to a 3G EMS to enable the 3G EMS to delete a 3 G-to-LTE neighbor relation.

In the method provided in the present invention, an LTE EMS obtains, according to a received LTE-to-3G neighbor relation, a policy corresponding to the discovery message among locally stored policies; and sends, if the policy allows a bidirectional neighbor relation, a message for establishing a 3G-to-LTE neighbor relation to a 3G EMS to enable the 3G EMS to establish a 3G-to-LTE neighbor relation. In the method provided in the present invention, a 3G UE does not need to additionally support an ANR function in establishing a 3G-to-LTE neighbor relation. Therefore, the functions of the 3G UE impose no limitation on the establishment of the 3G-to-LTE neighbor relation, and the 3G UE in the method imposes few limitations on the establishment of the neighbor relation, so a network terminal has few limitations.

Optionally, the method may further include: when an LTE-3G neighbor relation policy stored locally on the LTE EMS changes, updating a neighbor relation between the LTE system and the 3G system according to the changed policy.

The specific implementation manner may be: taking the foregoing step as an example, if the original policy supports a bidirectional neighbor relation but the changed policy does not support the bidirectional neighbor relation, deleting the 3G-to-LTE neighbor relation; if the original policy does not support a bidirectional neighbor relation but the changed policy supports the bidirectional neighbor relation, establishing a 3G-to-LTE neighbor relation.

Optionally, according to networking requirements, a user (such as an operator) may flexibly configure the LTE-3G neighbor relation policy stored locally. For example, when the coverage of an LTE system horizontally overlaps the coverage of a 3G system in certain regions or the coverage of an LTE system is adjacent to the coverage of a 3G system in certain regions, a bidirectional neighbor relation or a unidirectional neighbor relation may be set.

Figure 5:
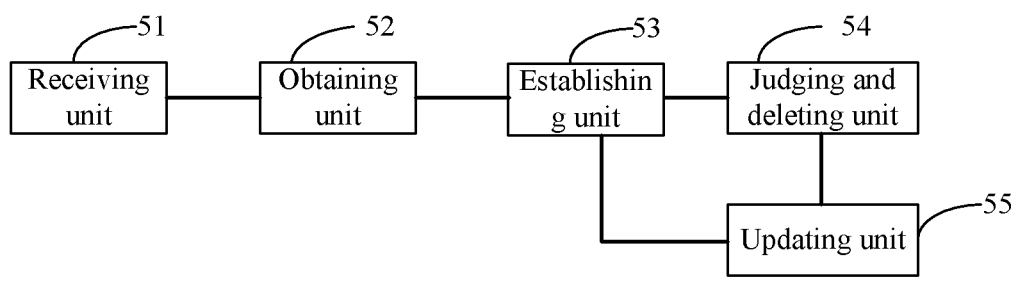
FIG. 5 is a structural diagram of an apparatus for establishing a neighbor relation according to an embodiment of the present invention.

The present invention further provides an apparatus for establishing a neighboring relation. Specifically, the apparatus may be an NMS. As shown in FIG. 5, the apparatus includes a receiving unit 51, an obtaining unit 52, and an establishing unit 53.

The receiving unit 51 is configured to receive a discovery message sent by a long term evolution element management system LTE EMS for discovering an LTE-to-3G neighbor relation; the obtaining unit 52 is configured to obtain, according to the discovery message, an LTE-3G neighbor relation policy corresponding to the LTE-to-3G neighbor relation among locally stored LTE-3G neighbor relation policies; and the establishing unit 53 is configured to establish a 3G-to-LTE neighbor relation if the policy allows a bidirectional neighbor relation.

Optionally, the apparatus may further include a judging and deleting unit 54, configured to, if the policy does not allow a bidirectional neighbor relation, determine whether a 3G-to-LTE neighbor relation corresponding to the LTE-to-3G neighbor relation exists in the 3G system; and if the 3G-to-LTE neighbor relation corresponding to the LTE-to-3G neighbor relation exists, delete the 3G-to-LTE neighbor relation from the 3G system.

Optionally, the apparatus may further include an updating unit 55, configured to, when a locally stored LTE-3G neighbor relation policy changes, update a neighbor relation between the LTE system and the 3G system according to the changed policy.

The apparatus provided in the present invention receives a discovery message sent by an LTE EMS for discovering an LTE-to-3G neighbor relation, obtains a policy corresponding to the LTE-to-3G neighbor relation among locally stored policies, and establishes a 3G-to-LTE neighbor relation if the policy allows a bidirectional neighbor relation. In the apparatus provided in the present invention, a 3G UE does not need to additionally support an ANR function in establishing a 3G-to-LTE neighbor relation. Therefore, the functions of the 3G UE impose no limitation on the establishment of the 3G-to-LTE neighbor relation, the 3G UE in the apparatus imposes few limitations on the establishment of the neighbor relation, so a network terminal has few limitations.

Figure 6:
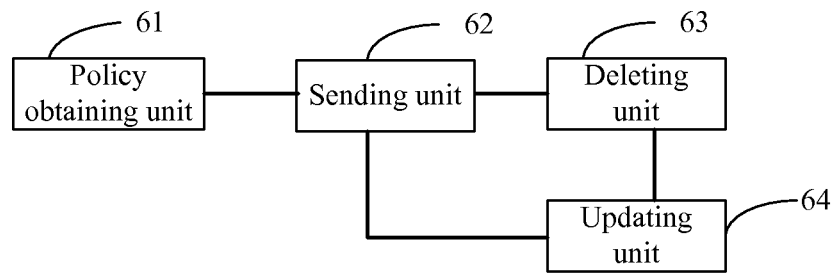
FIG. 6 is a structural diagram of an apparatus for establishing a neighbor relation according to an embodiment of the present invention.

In another embodiment, the present invention further provides an apparatus for establishing a neighboring relation. Specifically, the apparatus may be an LTE EMS. As shown in FIG. 6, the apparatus includes a policy obtaining unit 61 and a sending unit 62.

The policy obtaining unit 61 is configured to obtain, according to a received LTE-to-3G neighbor relation, an LTE-3G neighbor relation policy corresponding to the LTE-to-3G neighbor relation among locally stored LTE-3G neighbor relation policies. The sending unit 62 is configured to, if the policy allows a bidirectional neighbor relation, send a message for establishing a 3G-to-LTE neighbor relation to a 3G EMS to enable the 3G EMS to establish a 3G-to-LTE neighbor relation.

Optionally, the apparatus may further include a deleting unit 63, configured to, if the policy does not allow the bidirectional neighbor relation, send a message for deleting a 3G-to-LTE neighbor relation to a 3G EMS to enable the 3G EMS to delete a 3G-to-LTE neighbor relation.

Optionally, the apparatus may further include an updating unit 64, configured to, when a locally stored LTE-3G neighbor relation policy changes, update a neighbor relation between the LTE system and the 3G system according to the changed policy.

The apparatus provided in the present invention obtains, according to an LTE-to-3G neighbor relation, a policy corresponding to the discovery message among locally stored policies; and if the policy allows a bidirectional neighbor relation, sends a message for establishing a 3G-to-LTE neighbor relation to a 3G EMS to enable the 3G EMS to establish a 3G-to-LTE neighbor relation. In the apparatus provided in the present invention, a 3G UE does not need to additionally support an ANR function in establishing a 3G-to-LTE neighbor relation. Therefore, the functions of the 3G UE impose no limitation on the establishment of the 3G-to-LTE neighbor relation, the 3G UE in the apparatus imposes few limitations on the establishment of the neighbor relation, so a network terminal has few limitations.

In another embodiment, the present invention further provides a system for establishing a neighbor relation, including a long term evolution element management system LTE EMS, a 3rd generation mobile communication element management system 3G EMS, and a network management system NMS. The LTE EMS is configured to send a discovery message for discovering an LTE-to-3G neighbor relation. The NMS is configured to obtain, according to the received discovery message, an LTE-3G neighbor relation policy corresponding to the LTE-to-3G neighbor relation among locally stored LTE-3G neighbor relation policies; and establish a 3G-to-LTE neighbor relation if the policy allows a bidirectional neighbor relation.

In the system provided in the present invention, after an LTE EMS sends a discovery message for discovering an LTE-to-3G neighbor relation, an NMS obtains, according to the discovery message, a policy corresponding to the LTE-to-3G neighbor relation among locally stored policies, and establishes a 3G-to-LTE neighbor relation if the policy allows a bidirectional neighbor relation. In the system provided in the present invention, a 3G UE does not need to support an ANR function in establishing a 3G-to-LTE neighbor relation. Therefore, the functions of the 3G UE impose no limitation on the establishment of the 3G-to-LTE neighbor relation, the 3G UE in the apparatus imposes few limitations on the establishment of the neighbor relation, so a network terminal has few limitations.

In another embodiment, the present invention provides a system for establishing a neighbor relation, including a long term evolution element management system LTE EMS, a 3rd generation mobile communication element management system 3G EMS, and a network management system NMS. The LTE EMS is configured to obtain, according to a received LTE-to-3G neighbor relation, an LTE-3G neighbor relation policy corresponding to the LTE-to-3G neighbor relation among locally stored LTE-3G neighbor relation policies; and send an establishment message for establishing a 3G-to-LTE neighbor relation to the 3G EMS if the policy allows a bidirectional neighbor relation. The 3G EMS is configured to establish a 3G-to-LTE neighbor relation according to the establishment message.

The system provided in the present invention obtains, according to an LTE-to-3G neighbor relation, a policy corresponding to the discovery message among locally stored policies; and if the policy allows a bidirectional neighbor relation, sends an establishment message for establishing a 3G-to-LTE neighbor relation to a 3G EMS, so that the 3G EMS establishes a 3G-to-LTE neighbor relation according to the establishment message. In the system provided in the present invention, a 3G UE does not need to additionally support an ANR function in establishing a 3G-to-LTE neighbor relation. Therefore, the functions of the 3G UE impose no limitation on the establishment of the 3G-to-LTE neighbor relation, the 3G UE in the apparatus imposes few limitations on the establishment of the neighbor relation, so a network terminal has few limitations.

The technical solutions provided in the present invention have the advantage that a network terminal has few limitations.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, a detailed working process of the foregoing system, apparatus, and unit may refer to the corresponding process in the foregoing method embodiments, and details are not repeated herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disc.

The foregoing descriptions are merely exemplary embodiments of the present invention, but are not intended to limit the present invention. Any modification, equivalent replacement or improvement derived without departing from the principle of the present invention shall all fall within the protection scope of the present invention.

What is claimed is:

1. A method for establishing a neighbor relation, comprising:

receiving a discovery message sent by a long term evolution element management system (LTE EMS) for discovering an LTE to 3rd generation mobile communication (3G) neighbor relation;

obtaining, when determining no support for an automatic neighbor relation (ANR) functionality exists, an LTE-3G neighbor relation policy corresponding to the LTE-to-3G neighbor relation of the discovery message received among locally stored LTE-3G neighbor relation policies, the obtaining of the LTE-3G neighbor relation policy being by a network management system (NMS) through an inter-system neighbor information exchange between the LTE EMS, a 3G EMS and the NMS; and establishing a 3G-to-LTE neighbor relation through the LTE-3G neighbor relation policy among the locally stored LTE-3G neighbor relation policies when the LTE-3G neighbor relation policy obtained allows a bidirectional neighbor relation.

2. The method according to claim 1, wherein when the LTE-3G neighbor relation policy does not allow the bidirectional neighbor relation, determining whether a 3G-to-LTE neighbor relation corresponding to the LTE-to-3G neighbor relation exists in the 3G system; and when the 3G-to-LTE neighbor relation corresponding to the LTE-to-3G neighbor relation exists, deleting the 3G-to-LTE neighbor relation from the 3G system.

3. The method according to claim 1, further comprises:

when a locally stored LTE-3G neighbor relation policy changes, updating a neighbor relation between the LTE system and the 3G system according to the changed policy.

4. A method for establishing a neighbor relation, comprising:

obtaining, according to a received LTE to 3rd generation mobile communication (3G) neighbor relation, an LTE-3G neighbor relation policy corresponding to the LTE-to-3G neighbor relation received among locally stored LTE-3G neighbor relation policies, the obtaining of the LTE-3G neighbor relation policy being when determining no support for an automatic neighbor relation (ANR) functionality exists and the obtaining of the LTE-3G neighbor relation policy being by a network management system (NMS) through an inter-system neighbor information exchange between an LTE EMS, a 3G EMS and the NMS; and when the LTE-3G neighbor relation policy obtained allows a bidirectional neighbor relation, sending a message for establishing a 3G-to-LTE neighbor relation to a 3G EMS to enable the 3G EMS to establish a 3G-to-LTE neighbor relation.

5. The method according to claim 4, further comprising: when the LTE-3G neighbor relation policy does not allow the bidirectional neighbor relation, sending a message for deleting a 3G-to-LTE neighbor relation to the 3G EMS to enable the 3G EMS to delete a 3G-to-LTE neighbor relation.

6. The method according to claim 4, further comprising: when a locally stored LTE-3G neighbor relation policy changes, updating a neighbor relation between the LTE system and the 3G system according to the changed policy.

7. A network management system (NMS) apparatus for establishing a neighbor relation, comprising:
a receiving unit, configured to receive a discovery message sent by a long term evolution element management system (LTE EMS) for discovering an LTE to 3rd generation mobile communication (3G) neighbor relation;
an obtaining unit, configured to obtain an LTE-3G neighbor relation policy corresponding to the LTE-to-3G neighbor relation of the discovery message received among locally stored LTE-3G neighbor relation policies, the obtaining unit obtaining the LTE-3G neighbor relation policy when determining no support for an automatic neighbor relation (ANR) functionality exists and the obtaining of the LTE-3G neighbor relation policy being by a network management system (NMS) through an inter-system neighbor information exchange between the LTE EMS, a 3G EMS and the NMS; and
a establishing unit, configured to establish a 3G-to-LTE neighbor relation through the LTE-3G neighbor relation policy among the locally stored LTE-3G neighbor relation policies of the NMS when the LTE-3G neighbor relation policy obtained allows a bidirectional neighbor relation.

8. The apparatus according to claim 7, further comprising:
a judging and deleting unit, configured to, when the LTE-3G neighbor relation policy does not allow the bidirectional neighbor relation, determine whether a 3G-to-LTE neighbor relation corresponding to the LTE-to-3G neighbor relation exists in the 3G system; and when the 3G-to-LTE neighbor relation corresponding to the LTE-to-3G neighbor relation exists, delete the 3G-to-LTE neighbor relation from the 3G system.

9. The apparatus according to claim 7, further comprising:
an updating unit, configured to, when a locally stored LTE-3G neighbor relation policy changes, update a neighbor relation between the LTE system and the 3G system according to the changed policy.

10. An apparatus for establishing a neighbor relation, the apparatus being a network management system (NMS), comprising:
a policy obtaining unit, configured to obtain an LTE-3G neighbor relation policy corresponding to a received LTE-to-3G neighbor relation among locally stored LTE-3G neighbor relation policies, the policy obtaining unit obtaining the LTE-3G neighbor relation policy when determining no support for an automatic neighbor relation (ANR) functionality exists and the obtaining of the LTE-3G neighbor relation policy being by a network management system (NMS) through an inter-system neighbor information exchange between an LTE EMS, a 3G EMS and the NMS; and
a sending unit, configured to, when the LTE-3G neighbor relation policy obtained allows a bidirectional neighbor relation, send a message for establishing a 3G-to-LTE neighbor relation to a 3G EMS to enable the 3G EMS to establish a 3G-to-LTE neighbor relation through the LTE-3G neighbor relation policy among the locally stored LTE-3G neighbor relation policies of the NMS.

11. The apparatus according to claim 10, further comprising:
a deleting unit, configured to, when the LTE-3G neighbor relation policy does not allow the bidirectional neighbor relation, send a message for deleting a 3G-to-LTE neighbor relation to the 3G EMS to enable the 3G EMS to delete a 3G-to-LTE neighbor relation.

12. The apparatus according to claim 10, further comprising:
an updating unit, configured to, when a locally stored LTE-3G neighbor relation policy changes, update a neighbor relation between the LTE system and the 3G system according to the changed policy.

* * * * *